Patented May 29, 1951

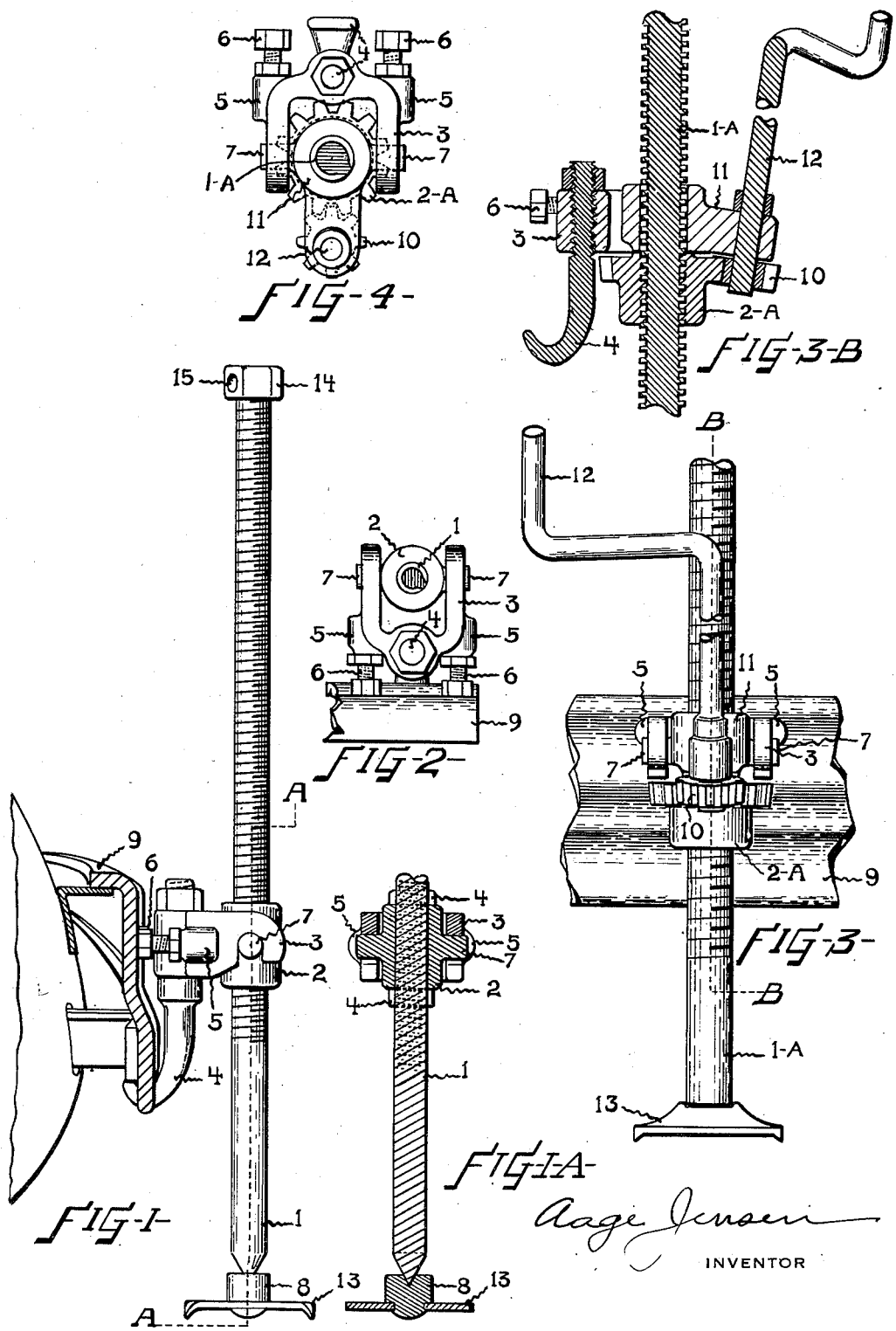

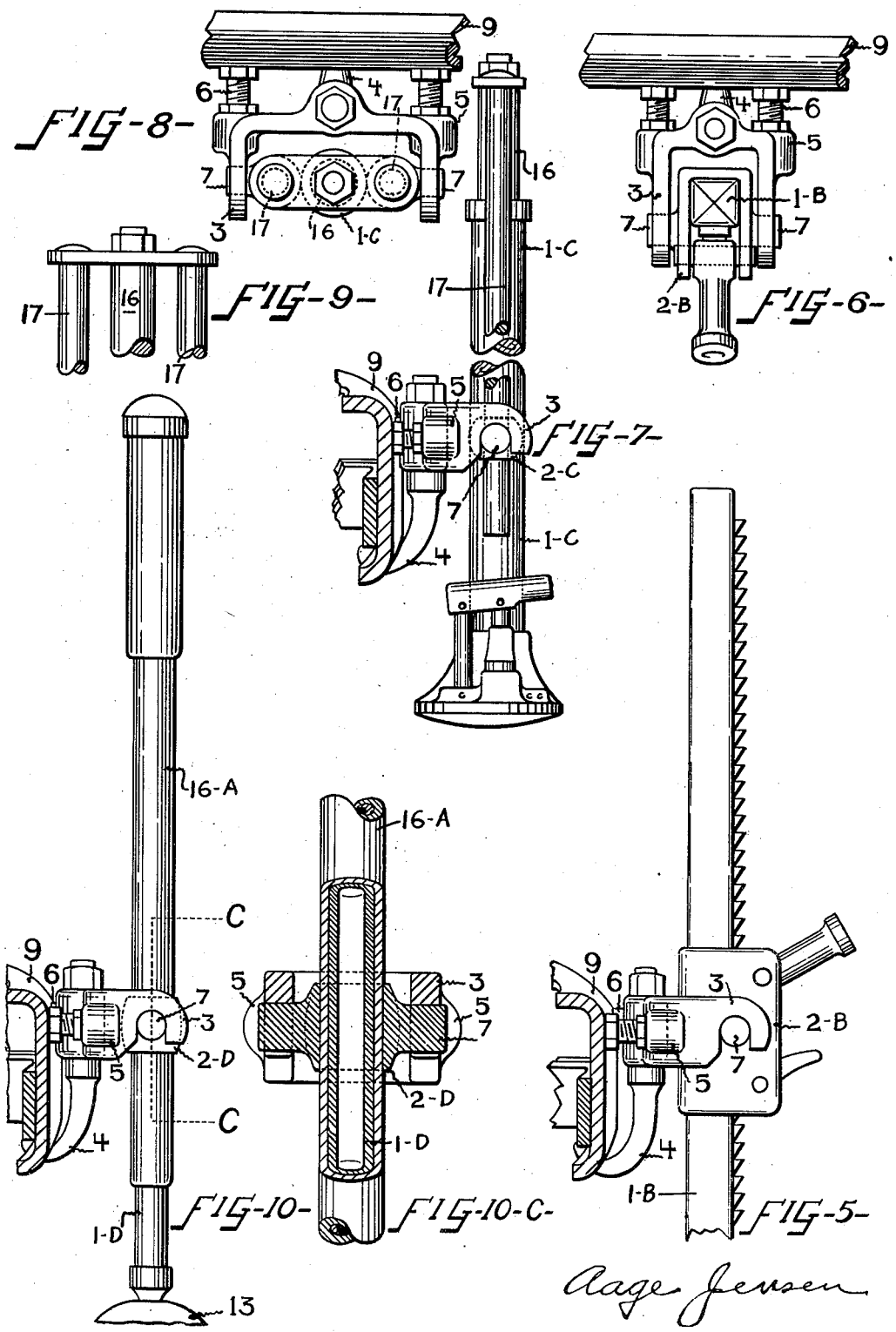

2,554,910

UNITED STATES PATENT OFFICE 2,554,910

VEHICLE LIFTING DEVICE

Aage Jensen, Kenosha, Wis.

Application January 4, 1947, Serial No. 720,152

7 Claims. (Cl. 254—133)

This invention broadly contemplates to provide universal and efficient connective-means, between, a vehicle lifting-device and a vehicle bumper, which will enable the lifting device to operate without incurring needless stress, binding, or unnecessary friction between parts thereof which should move freely.

Lifting a vehicle against the bumper has, heretofore, presented a complex problem due to the high lift required to clear the vehicle body from unsprung chassis riding springs. Lifting-devices now in the market engage the bumper through the medium of an extended ledge, hook, or clamp, in such manner, as to carry the load weight on the side of the power impelled lifting-member of the lifting-device, thus causing; great binding strain to the working parts of a lifting-device, and needless manual effort in the operation of lifting a vehicle. Rigid clamping of the bumper to the side of the power impelled lifting-member causes even greater binding strain in the movable parts of a lifting-device and, consequently, greater manual effort to operate the lifting-device.

It is obvious, therefore, that the connective-means (linkage) between the vehicle lifting-device and the vehicle bumper must be so conceived as to have the novel capacity to convey, or transfer, the weight of the lifted vehicle directly to the vertical, gravitational, axis of the lifting-device.

Engaging the bumper, in the connective-means, a moderately J-shaped hook makes a one point contact with lower bumper portion, and thereon and thereover, preferably, a two point movable contact on bumper face. Thus, the J-hook has the capacity to move in lateral arc, on the face of the bumper, pivoted from the one point contact with lower bumper portion; and thereby becoming movably responsive to side-wise inclination engendered in raising the vehicle. Yet it has positive rigidity horizontally, (viewed from the side) which enables it to lay the load weight directly on the gravitational axis of the lifting-device through the co-operating means of horizontal U-portioned arms, projected at right angles from the body of the J-hook, which semi-encircle the power impelled lifting member of a lifting-device, and which in turn, are pivotally engaged, by mutual bearing means, to the power impelled lifting-member in line transversely with the true gravitational axis of the lifting device. Thus forward, and backward movement of the vehicle weight registers responsively, when being raised, in balanced pivotal action over the true gravitational axis of the lifting-device.

In general, it can readily be understood that my improvement provides responsive equalizing means to offset objectionable thrust strains against the lifting-device due to equilibrium movement directions which the vehicle may assume when being lifted.

Another object of this invention is to promote lighter and more compact construction of vehicle lifting-device. The elimination of torsional stress and side pressure thrusts, makes possible refinement of the various parts entering into the construction of vehicle lifting-devices.

Other objects and advantages of the present invention will become apparent as a description of the same proceeds and the invention will be best understood from a consideration of the following detailed description taken in connection with the accompanying drawings forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawings:

Ten figures illustrate the universal novel utility of my improvement; in which Figure 1 is a view in side elevation of a screw-jack embodying the present invention showing the same in applied position.

Figure 1A is a sectional view along the dotted line A—A in Figure 1.

Figure 2 is a view in top elevation of the connective means, disclosing alignment to the bumper, and relation to the power impelled lifting-member on the jack-screw, substantially, as of Figure 1.

Figure 3 is a view in rear elevation of a back geared screw-jack in applied position, wherein the power impelled lifting-member supports a sleeve encompassing the jack-screw, and wherein said sleeve engages, pivotally, with receptive bearing means embodied in the aforesaid connective-means.

Figure 3B is a sectional view along the dotted line B—B as of Figure 3.

Figure 4 is a view in top elevation of the connective-means, disclosing relation to the power impelled lifting-member and supported, pivot-means equipped, sleeve encompassing the jack-screw.

Figure 5 is a view in side elevation of a mechanical ratchet type jack, showing in position therewith, a vehicle bumper, pivotally engaged to the ratchet jack, by means of the aforesaid novel connective-means.

Figure 6 is a view in top elevation of the mechanical ratchet type jack showing relation of the novel connective-means to the power impelled lifting-member and the bumper.

Figure 7 is a positioned view in side elevation of a hydraulic type jack showing the vehicle bumper, and connective-means, engaging pivotal provisions suitably incorporated in the power impelled, down draped, standards of said hydraulic jack.

Figure 8 is a view in top elevation, substantially as of the hydraulic jack in Figure 7, disclosing, connective-means engaging vehicle bumper and pivotal provisions on the power impelled down draped standards.

Figure 9 is a view in rear elevation showing cross-head supporting down draped standards, as of Figure 7.

Figure 10 is a view in side elevation of another type of hydraulic jack wherein engaging means between the vehicle bumper and the bumper jack follow practically the same general pattern as described in the preceding types of bumper jacks.

Figure 10C is a view in cross section taken along the dotted line C—C in Figure 10.

Referring to the drawings in detail; in Figures 1 to 2, inclusive, the threaded jack screw is designated by the numeral 1. In Figures 3 to 4, inclusive, the threaded jack screw is designated by the numeral 1—A.

In Figures 1 to 2, inclusive, the threaded jackscrew 1 supports a threaded nut, the power impelled lifting-member 2, and, on the body of the lifting-member 2 are stub shaft projections 7, and for engagement with stub shaft projections 7 suitable pivotal bearing means are provided in the extended arms of U-portion 3, which semi-encompasses the lifting-member 2. Through the base portion of the U-member 3, or extending downward therefrom, is a generally J-shaped bumper engaging hook 4 suitably formed to engage, pivotally, the lower edge of the bumper 9. Projecting from the base portion of the U-member 3, on the same horizontal plane, suitably spaced, facing the bumper 9 are abutment provisions 5, which, in the drawings, show adjustable facilities for proper alignment to the contours of the bumper face 9. However, it is anticipated that these abutment provisions 5 and the co-operating screw 6 may be incorporated into a single nonadjustable abutment if utility conditions permit, and it is further anticipated, when it may become practical, from a manufacturing standpoint, to eliminate the piece by piece construction, of the connective means, by making the parts 3, 4, 5, and 66 into one compact unit. 14 is an enlargement of the threaded jack-screw 1 and 15 is a hole therethrough for insertion of a lever-bar to rotate the threaded jack-screw 1 against the power impelled lifting-member 2. 8 is a pivotal receptacle in the base plate 13.

In Figures 3 to 4, inclusive, the threaded jack-screw 1—A is not rotated to impel the lifting-member 2—A as in Figure 1. The lifting-member 2A is rotated by a pinion gear 10 in mesh with a larger gear integral with the lifting-member 2—A. A sleeve 11, with straight inside walls, encompasses, loosely, the threaded jack-screw 1A, thrusting its adjacent end face against the top face of the power impelled lifting member 2—A. In the sleeve 11 bearing means are provided to support the crank shaft 12 to which the pinion gear 10 is affixed. And again, projecting from the body of the sleeve 11 stub shaft bearing means, 7 are provided to engage receptive bearing provisions in the semi-encircling arms of the U-portion 3. From the drawings, and previous description in a foregoing paragraph, it is obvious that the connective-means, from the point of description just terminated, in this paragraph, to the point of contact with the vehicle bumper is, in substance, practically as described in the preceding paragraph insofar as there is no material difference in structure or design.

In Figures 5 and 6 a ratchet mechanism housing 2—B is shown, which is similar in purpose as the numerical parts 2 in Figure 1 and as 2—A in Figure 3, and which have been previously described as the power impelled members. On the body of the power impelled lifting-member 2—B is provided stub shaft projections 7, with the diametral centers thereof crossing the gravitational axis of the vertical lift, to engage correlative bearing means incorporated in the semi-encircling U-member 3 for pivotal action therewith. It is of course, understood, that pivotal action may be attained, when practical, by a reversal of parts, therebetween, that is, stub shaft projections 7 may be incorporated into the U-portion 3 and receptive female bearing surfaces may be provided in the power impelled housing member 2—B. From the pivotal parts 7 on the housing 2—B, to the point of bumper 9 contact, the connective-means remains, as described, in the second paragraph of numerical detail. There is no change in structure.

In Figures 7, 8, and 9 is shown a hydraulic type jack having a supporting standard 1—C. Propelled from the restraining walls of the standard 1—C is the impelled lifting member 16 which supports a crosshead member having two down draped standards 17. Affixed to, or being a part of the down draped standards 17 is the power impelled lifting-member 2—C performing in the same pivotal pattern as, the preceding lifting-members, namely, 2, 2—A and 2—B, which have stub shaft projections 7 to engage with receptive bearing means in the U-portion 3. From the pivotal parts 7, on the down draped standards 17 to the point of bumper contact, the connective-means remains, as described, in the second paragraph of numerical detail. There is no change in structure.

In Figures 10 and 10—C another conventional type of hydraulic jack is shown. Telescoping the standard 1—D is the impelled lifting-member 16—A, and affixed, or being a part thereof, is the power impelled lifting-member 2—D, and, on the body of the power impelled lifting-member 2—D are stub shaft projections 7 to engage pivotally with correlative bearing means incorporated in the semi-encircling U-member 3. From the pivotal parts 7 on the power impelled lifting-member 2—D to the point of bumper 9 contact, the connective-means remains, as described, in the second paragraph of numerical detail, there is no change in structure.

Thus from the foregoing description it is clearly obvious that my improvements in the connective means between a vehicle lifting-device and a vehicle bumper are adaptable to lifting-devices now in use, and that the same will serve greatly needed and very useful purposes.

Having thus described my invention, what I claim is:

1. In combination, a standard, a load lifting member, means to raise and lower the load lifting member relative to the standard, a U-shaped yoke pivoted to said load lifting member, a vehicle having a part to be lifted, and engagement means between said yoke and said part.

2. The structure of claim 1 wherein the engagement means comprises a J-shaped hook mounted in the base of said yoke in a plane normal to the pivot of said yoke, said hook engaging said part.

3. The structure of claim 2 and abutments extending from the base of said yoke to brace said part.

4. A jack comprising a base, a jack screw supported on said base, a nut threaded on said jack screw, stub shaft projections extending horizontally outward on opposite sides of the nut, a U-shaped yoke having a base and side arms, a downwardly opening notch on each side arm to engage a stub shaft projection, said notches and projections forming pivotal bearing surfaces, and a J-shaped hook depending from the base of the yoke to engage a load.

5. The structure of claim 4 and spaced abutments on the base of the yoke projecting horizontally outward in a direction opposite the side arms to brace the load.

6. A jack comprising a base, a jack screw supported on said base, a nut threaded on said screw, said nut having teeth on its periphery, a sleeve loosely received on said screw and resting on said nut, a handle journaled in said sleeve, a pinion on said handle meshing with the peripheral teeth on said nut, projections on opposite sides of the sleeve extending outwardly of the sleeve, a U-shaped yoke having a base and side arms, said side arms being pivotally journaled on said projections, and a hook depending from the base of the yoke to engage the load.

7. The structure of claim 6 and adjustable spaced abutments extending from the base of the yoke to brace the load.

AAGE JENSEN.

REFERENCES CITED

The following references are of record in the file of this patent:

UNITED STATES PATENTS

| Number | Name | Date |
|---|---|---|
| 1,148,856 | Quesenberry | Aug. 3, 1915 |
| 1,994,984 | Orlow | Mar. 19, 1935 |
| 2,149,248 | Haferkorn | Feb. 28, 1939 |
| 2,165,366 | Gormley | July 11, 1939 |

FOREIGN PATENTS

| Number | Country | Date |
|---|---|---|
| 467,563 | Great Britain | June 18, 1937 |